Nov. 24, 1970

F. B. SYLVANDER 3,543,083

METHOD AND MEANS FOR PROVIDING A DISPLAY
OF MOVING BANDS OF LIGHT

Filed Sept. 15, 1967

INVENTOR.
FREDERICK BLANCKE SYLVANDER
BY Herbert L. Davis

ATTORNEY

FIG. 10

ALTERNATE METHOD OF EXCITATION TO OBTAIN ROTARY LIGHT PATTERN AT A SPEED PROPORTIONAL TO SPEED OF ROTATION OF A ROTOR OF A SYNCHRO-RSVR.

METHOD OF EXCITATION TO DISPLAY DIFFERENTIAL MOTION OF ROTORS OF TWO SYNCHRO RESOLVERS

FIG. 11

INVENTOR.
FREDERICK BLANCKE SYLVANDER
BY *Herbert L. Davis*
ATTORNEY

United States Patent Office 3,543,083
Patented Nov. 24, 1970

3,543,083
METHOD AND MEANS FOR PROVIDING A DISPLAY OF MOVING BANDS OF LIGHT
Frederick B. Sylvander, Rutherford, N.J., assignor to The Bendix Corporation, a corporation of Delaware
Filed Sept. 15, 1967, Ser. No. 668,099
Int. Cl. H01v 7/00; H05b 33/00
U.S. Cl. 315—55
28 Claims

ABSTRACT OF THE DISCLOSURE

A method and means for effecting a solid state display of lighted stripes which may be moved in a direction and at a speed controllable by an operating condition.

In one form of the invention, the display is effected by applying alternating voltages to a bar of a piezoelectric material polarized in a sense perpendicular to a display surface and parallel to the thickness of the bar so as to set up in the piezoelectric material standing waves of vibration extending transverse the thickness of the bar. Further an acoustical return path is provided either of the same piezoelectric material or of a material which has essentially identical acoustic properties so that a standing wave pattern may be set up which would vary in position directly as its point of excitation on the bar, whereupon secondary voltages are generated in the material due to these vibrations which vary in amplitude at any given time with the point along the bar at which the generated voltage may be sensed. The excitation of an electroluminescent phosphor coating on a display surface of the bar by these varying secondary voltages generated in the piezoelectric material produces a desired display pattern of dark and light bands which may be stationary or movable in a direction and at a speed dependent upon the operative sense of the excitation voltages.

In a modified form of the invention, a toroidal ring of a piezoelectric material polarized in a sense perpendicular to a display surface and parallel to the thickness of the ring has an electroluminescent phosphor coating applied at a display surface of the ring and covered by a transparent conductive layer, while an opposite surface of the ring has a grounded electrode provided thereon.

The display is effected by applying alternating voltages to the piezoelectric material so as to set up standing waves of vibration extending transverse the thickness of the toroidal ring while there is provided a closed acoustical return path around the toroidal ring so that a standing wave pattern may be set up which would vary in position directly as its point of excitation on the toroidal ring, whereupon secondary voltages are generated in the material due to these vibrations which vary in amplitude at any given time directly with the point on the ring at which the generated voltage may be sensed so that a resultant excitation of the electroluminescent phosphor coating on the display surface at one side of the ring by these varying secondary voltages generated in the piezoelectric material may produce a display pattern of dark and light bands which may be stationary or movable in a direction and at a speed dependent upon the operative sense of the excitation voltages.

BACKGROUND OF THE INVENTION

Field of the invention

This invention has applications in the field of peripheral displays such as used in aircraft. The invention is particularly directed to a method and means for generating a display pattern of dark and light bands which may be stationary or movable in a direction and at a speed dependent upon the operative sense of the excitation voltages and without any moving parts and a display which is self-illuminated thereby making maximum utilization of the required light.

Description of the prior art

Heretofore so-called "barber pole" type displays have been commonly used to call the pilot's attention to left and right or up and down commands by this type of display which easily attracts his attention without being in his direct field of view. Such displays are commonly constructed using rotating cylinders or moving tapes.

An electroluminescent-piezoelectric bar graph display system is disclosed in a U.S. Pat. No. 3,202,868 granted Aug. 24, 1965 to Hans G. Blank in which a linear lighted display is effected by transmitting an electrical pulse or voltage step to a piezoelectric sheet or bar to produce in the bar a mechanical strain which is proportional to the amplitude of the voltage step and a disturbance in the form of a traveling elastic wave accompanied by an electric field which is propagated at a constant speed in the bar toward an opposite edge thereof. The intensity of this electric field is proportional to the time rate of change of the strain producing it and is not of sufficient magnitude to cause an electroluminescent layer to emit light. A variable length voltage having a duration which is proportional to the magnitude of the variable to be displayed is applied to a transparent input electrode at the instant the traveling elastic wave in the piezoelectric bar reaches the edge of the electroluminescent layer. The sum of the voltage produced by the traveling wave and the input voltage is sufficient to cause the portion of the electroluminescent layer under the excited transparent electrode to emit light.

When the input voltage drops to zero, the portion of the electroluminescent layer still being swept by the electric field propagated in the piezoelectric bar ceases to emit light, because the traveling electric field is of insufficient magnitude to sustain light emission. Since the velocity of wave propagation in the piezoelectric material is a constant, the length of the light emitting portion of the electroluminescent layer under the transparent electrode is proportional to the duration of the input voltage and hence to the magnitude of the display variable. Thus the conjunction of the input voltage when it is present, with the piezoelectric output over the length that the elastic wave and accompanying electric field has traveled in the piezoelectric bar during that time, produces a lighted thermometer type display. The process is repeated at a rate which allows the traveling wave to pass out of the far end of the piezoelectric bar.

In the display system of the Blank U.S. Pat. No. 3,202,868, there is no suggestion of a traveling wave associated with an electroluminescent device to provide a moving display of light and dark bands as in the present invention nor is there any suggestion of a closed acoustical return path in a solid state electroluminescent display device as in the present invention.

While in a U.S. Pat. No. 3,157,823 granted Nov. 17, 1964 to Fred D. Clapp, here is disclosed an electroluminescent device wherein a luminous body of an ionizable gas is lighted by a number of standing waves in such a manner that a substantially continuous excitation field is provided, there is no suggestion of any means of effecting moving dark and light bands in a solid state electroluminescent display as in the present invention.

Further in a U.S. Pat. No. 3,118,079 granted Jan. 14, 1964 to Willi Lehmann, there is disclosed an application of a variable frequency alternating current source to an electroluminescent cell so as to selectively excite different phosphor components to produce different and contrasting colors, but there is no suggestion therein of any means to generate traveling standing waves to provide a moving display of dark and light bands in a solid state electroluminescent display as in the present invention.

SUMMARY OF THE INVENTION

The invention contemplates a method and means for generating traveling standing waves associated with a solid state electroluminescent device so as to effect a moving display of dark and light bands.

An object of the invention is to provide a means and method for effecting in a solid state display, lighted stripes which may be moved in either of two directions at any desired speed.

Another object of the invention is to provide such a display means including a closed path formed at least in part of a piezoelectric material so that a standing wave pattern may be set up which may vary in position directly with the propagation thereof at a point of excitation on the piezoelectric material, and in association with the piezoelectric material a display surface including an electroluminescent phosphor and a transparent electrode coating over the phosphor serving as a connecting path for different phased voltages generated in alternate node patterns in the piezoelectric material so as to produce in conjunction with a capacitor effect of the piezoelectric material and a serially connected capacitor effect of the electroluminescent phosphor material an illumination display of the phosphor in a desired pattern of light and dark bands.

Another object of the invention is to provide a means and method for applying alternating voltages at spaced points along an element of a piezoelectric material so as to set up standing waves of vibrations in this material transverse the thickness of the element to cause secondary voltages to be generated in the material due to these vibrations effected to excite an electroluminescent phosphor coating on the material so as to produce a desired display pattern of dark and light bands.

Another object of the invention is to effect in such a means and method a moving display of light and dark bands in a solid state electroluminescent-piezoelectric device including a closed acoustical return path for generating traveling standing waves at points of excitation on the device.

Another object of the invention is to provide a solid state electroluminescent display device of a piezoelectric material having the shape of a thin bar or sheet with a surface area provided for the display and in which device the bar of piezoelectric material is poled across the thickness thereof and perpendicular to the display surface which is coated with a layer of an electroluminescent phosphor which emits light when alternating voltages are applied across the coating of electroluminescent phosphor with a transparent conductive layer over the phosphor serving as an electrode, while an opposite surface of the piezoelectric material is coated with a conductive material serving as an opposite electrode.

Another object of the invention is to provide such a display device in which the opposite ends of the thin bar or sheet of piezoelectric material is connected through an acoustical return path either of the same piezoelectric material or of some other material having essentially identical acoustic properties so that different phased secondary voltages may be generated by the standing waves of transverse vibrations set up by the alternating voltages applied to the piezoelectric material for effecting an excitation of the electroluminescent phosphor coating on the material to produce the desired pattern of lighted display.

Another object of the invention is to provide at least two excitation signals at a resonant frequency, one of which excitation signals is ninety degrees (90°) out of time phase with the other, while a third excitation signal is obtained from a separate alternating voltage source capable of being varied in frequency above and below the frequency of the first two signals to effect a controlling operation of the moving display of lighted stripes in both direction and speed.

Another object of the invention is to provide a solid state electroluminescent display of the aforenoted type including a first contact electrode to which there is applied a first alternating voltage to cause a periodic contraction and expansion of the thickness dimension at that point on the piezoelectric bar so as to effect a transverse vibration which will travel in both clockwise and counter clockwise directions around the closed acoustical path so as to result in standing waves of relatively high amplitude, while the aplied frequency of the first alternating voltage is so selected that the time of travel of the wave around the closed path is equal to one period of the applied voltage. Other resonant standing waves may be obtained at higher multiples of this frequency.

Another object of the invention is to provide a second contact electrode for applying a second alternating voltage at a point on the piezoelectric bar where a null vibration and voltage exists due to the first excitation and by applying a second alternating voltage of the same frequency as the first voltage, but shifted ninety degrees (90°) in phase to the second electrode, there is set up a second standing wave pattern in which the superposition of these two standing waves will result in a condition providing a constant magnitude variable phase signal across the thickness of the piezoelectric bar at all points.

Another object of the invention is to apply a third alternating signal voltage of slightly higher or lower frequency than the first to the transparent conductive layer covering the electroluminescent phosphor and thereby in series with the voltage output from the piezoelectric bar so as to effect a resultant frequency which is mathematically identical to the original frequency, but varying in phase at a rate proportional to the differences in frequency so that in effect the third alternating signal voltage from time to time will be added to or subtracted from the voltage output from the piezoelectric bar so that maximums and minimums in the total voltage applied to the electroluminescent phosphor will thus move along the display bar in a direction and at a rate determined by the frequency difference to control the illumination of the electroluminescent phosphor at varying points on the piezoelectric bar in accordance therewith to effect a moving display of light and dark bands.

Another object of the invention is to provide in a solid state electroluminescent display of the aforenoted type, means whereby the operating frequency may be chosen equal to the desired harmonic of the fundamental resonance so as to attain the desired number of such moving stripes, and means whereby the stripes may be at an angle to the direction of movement or may have the form of any single-valued line across the width of the display, depending upon the shape and orientation of the two excitation contacts.

Another object of the invention is to provide in a solid state electroluminescent display of the aforenoted type a closed acoustical loop to provide standing waves not affected by longitudinal boundary conditions.

Another object of the invention is to provide a method and means for a superposition of two standing waves in a solid state electroluminescent display device of the aforenoted type so as to obtain a constant amplitude, variable phase voltage output to effect in the solid state electroluminescent display moving light and dark bands.

Another object of the invention is to provide in the solid state electroluminescent display excitation voltages of different frequency in conjunction with a variable phase voltage output to generate moving positions of maximum and minimum voltage applied to the electroluminescent phosphor.

Another object of the invention is to provide a solid state electroluminescent display including a toroidal ring polarized parallel to the thickness of the ring and having an electroluminescent phosphor applied to a side surface of the toroidal ring and covered by a transparent conductive layer with at least two excitation contacts positioned on the surface in an angular spaced relation and a third contact positioned at the opposite side surface of the toroid from the excitation contacts and having applied thereto a resonant frequency excitation voltage so that a sufficient output voltage may be obtained from the piezoelectric material of the toroidal ring to cause a selective excitation of the phosphor in a predetermined light pattern and in which a lesser or greater number of illuminated nodes may be obtained by providing selected multiples of the resonant excitation frequency and by varying the ratio of the excitation amplitudes so that the illumination pattern may be caused to move to any desired poistion, while application of a voltage of a slightly different frequency may cause movement of the light pattern in a controlled direction and at a controllable speed.

Another object of the invention is to provide in a solid state electroluminescent display of the aforenoted toroidal type, means for effecting alternating voltages of different excitation frequency to be mixed with each of the original excitations to cause in-phase carriers and quadrature modulation envelopes at the two excitation contacts.

Another object of the invention is to provide a solid state electroluminescent display device of the aforenoted toroidal type, including means whereby a phase shifter may be connected so as to cause the solid state display to effect a movable light pattern indicative of the difference and sense of the difference in the velocities between two rotatable units, as well as showing the differential positional movement and accurate differential velocity of the rotatable units.

Another object of the invention is to provide a means and method of excitation of an electroluminescent phosphor by means of standing waves of voltage in a piezoelectric material caused by standing waves of transverse vibration in a closed acoustical path.

Another object of the invention is to provide a means and method for effecting excitation of multi-node light patterns causing movable light patterns in either direction at a controllable speed dependent upon a sensed condition.

Another object of the invention is to provide a method and means of displaying the differential rotation of two positional transducers by means of a solid state electroluminescent display.

Another object of the invention is to provide a means and method of displaying the motion of a single resolver-type transducer for a solid state electroluminescent display.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

BRIEF DESCRIPTION OF THE DRAWINGS

Referring to the drawings in which corresponding numerals indicate corresponding parts in the several views.

DESCRIPTION OF THE INVENTION EMBODIED IN A FIRST FORM

Figure 1:
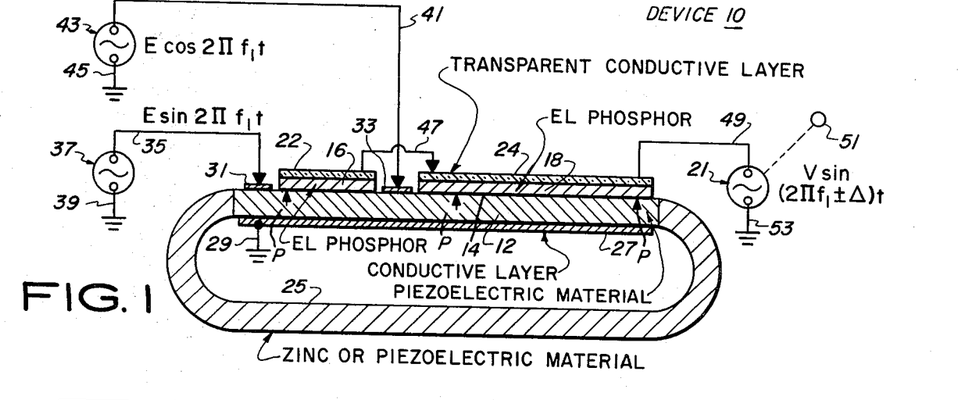
FIG. 1 is a sectional view taken along the lines 1—1 of FIG. 2 and looking in the direction of the arrows and illustrating a display device embodying the present invention in which a bar of piezoelectric material is polarized in a direction as indicated by the arrows P parallel to a thickness of the bar and perpendicular to a display surface on the bar.
Figure 2:
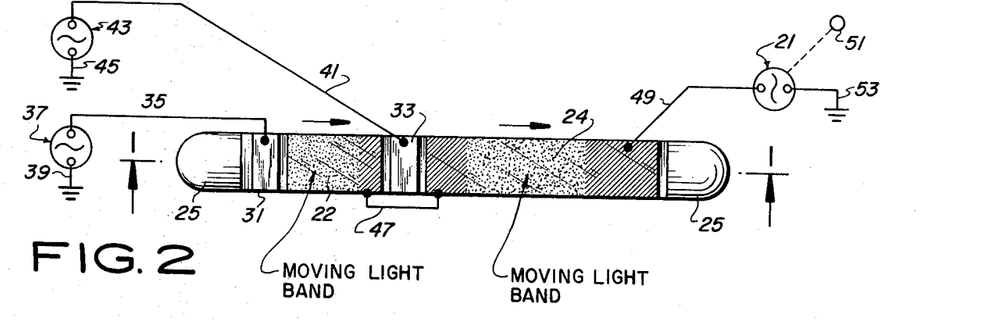
FIG. 2 is a top plan view of FIG. 1 illustrating the display surface of the piezoelectric bar with bands of lighted portions indicated by dots on the drawing at a particular instant of time.
Figure 3:
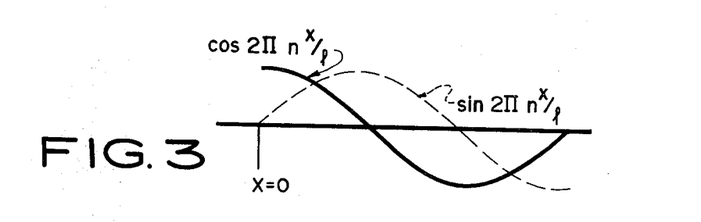
FIG. 3 is a graphical illustration of the amplitude of standing waves of vibration, voltage and brightness (in which the brightness is a non-linear function of voltage due to the electroluminescent phosphor characteristics) which would be set up due to excitation at each of two separate points on the piezoelectric material of the display bar, as illustrated by FIG. 1, and in which each of the excitations are a quarter of a wave length apart relative to the particular resonant pattern.
Figure 4:
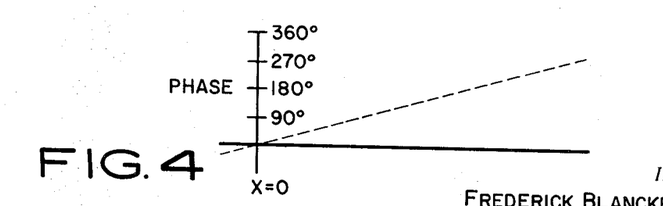
FIG. 4 is a graphical illustration of a phase of the resultant output voltage caused by application of the two excitations at the two separate points on the piezoelectric material, as illustrated on FIG. 1, when such excitations are in time quadrature and in which the magnitude of the output voltage is substantially constant at all locations of the piezoelectric material.

Referring now to FIGS. 1 and 2, the solid state electroluminescent display device is indicated generally by the numeral 10 and includes a thin bar or sheet 12 having an upper surface area 14 for supporting an electroluminescent display. The material of the bar or sheet 12 may be of any suitable piezoelectric material such as lead-zirconate-titanate properly poled as indicated by the arrows P in a direction extending parallel to the thickness of the bar or sheet 12 and perpendicular to the display surface 14 thereof. The piezoelectric material of the bar or sheet 12 is further so selected as to provide the desired stability and sensitivity to effect the electroluminescent display as hereinafter explained.

The display surface 14 of the bar or sheet 12 is coated at 16 and 18 with layers of an electroluminescent phosphor, such as copper-activated zinc sulfide, and these layers 16 and 18 are arranged in spaced relation along the bar 12, as shown in FIG. 1. The electroluminescent phosphor layers 16 and 18 are so arranged that portions thereof emit light when an alternating voltage in excess of a threshold value is applied across such portion of the layers 16 and 18.

Further mounted on the phosphor layers 16 and 18 are transparent conductive layers 22 and 24 which serve as electrodes for applying across the phosphor layers 16 and 18 and the piezoelectric bar 12 an alternating voltage from an external source of alternating voltage 21. The alternating voltage from the source 21 is applied in series with alternating voltages of different phases induced, as hereinafter explained, in the bar of piezoelectric material 12, as illustrated by the equivalent circuit of FIG. 5, so as to provide summation voltages along the bar 12 varying both above and below the light emitting threshold value of the phosphor layers 22 and 24. The resultant summation voltage thus effectively controls illumination of the phosphor layers 22 and 24 so as to provide at portions of the phosphor layers multiple light bands moving along the phosphor layers and thereby the bar 12 in a direction and at a speed dependent upon the phases of the voltages induced in the bar 12 of piezoelectric material adjacent thereto.

Further, there is provided a member 25 forming an acoustical return path leading from one end of the bar or sheet 12 to the opposite end thereof, as shown in FIG. 1. The acoustical return path member 25 may be formed of the same piezoelectric material as that of the bar or sheet 12 or of a suitable material such as an annealed-zinc which has essentially identical acoustical properties to that of the piezoelectric bar or sheet 12.

An opposite bottom surface of the piezoelectric bar or sheet 12 from the display surface 14 is coated with a conductive material 27 so as to provide an electrode which may be suitably connected through a conductor 29 to ground.

Moreover arranged in spaced relation and in direct contacting relation with the upper surface 14 of the bar or sheet 12 are two electrodes 31 and 33. The electrode 31 being positioned on the surface 14 of the rod 12 adjacent one end thereof while the electrode 33 is positioned on the surface 14 of the rod 12 in the space 20 between the electroluminescent phosphor coatings 16 and 18, respectively.

Electrode 31 is connected through a conductor 35 to one terminal of a suitable source of constant frequency alternating excitation voltage 37 having an opposite terminal connected through a conductor 39 to ground, while the other electrode 33 is connected through an electrical conductor 41 to a terminal of a suitable source of constant frequency alternating excitation voltage 43 having an opposite terminal connected through a conductor 45 to ground.

The two alternating excitation voltages supplied by the sources 37 and 43, respectively, are of the same constant frequency, and ninety degrees out of time phase with one another and are so arranged that the electrode 31 is excited by an alternating voltage applied by the source 37 which varies as a sine function of $2\pi f_1 t$ while the electrode 33 is excited by an alternating voltage of the same constant frequency, but which varies as a cosine function of $2\pi f_1 t$.

Further the applied frequency of the alternating voltage supplied by the sources 37 and 43 is of a resonant frequency, as hereinafter defined. Such alternating voltages may be obtained from different sources of alternating voltages 37 and 43 operating in time relation one with the other to effect the desired constant resonant frequency excitation voltages as aforesaid or such voltages may be conveniently obtained from the same oscillator by means of a phase splitting circuit as is well known in the art.

The transparent conductive layers 22 and 24 covering the electroluminescent phosphor coatings 16 and 18, respectively, are connected by a conductor 47 and in turn through a conductor 49 to one terminal of the source of alternating voltage 21 having an opposite terminal connected by a conductor 53 to ground. The alternating voltage supplied by the source 21 across the transparent conductive layers 22 and 24 and the grounded conductor 27 varies as a sine function of $(2\pi f_1 \pm \Delta)t$ in which $\Delta$ equals $2\pi$ multiplied by the difference in frequencies. The alternating voltage supplied by the source 21 may be set at a frequency either slightly above or below the frequency of the alternating excitation voltages supplied by the sources 37 and 43, by appropriate adjustment of an operator-operative frequency control 51. The setting of the frequency control 51, in selecting a frequency above or below the resonant frequency will in turn control the direction of movement of the light and dark bands of the light display on the device 10 of FIG. 2.

OPERATION OF THE SOLID STATE ELECTROLUMINESCENT DISPLAY DEVICE OF FIGS. 1 AND 2

In order that the display device 10 of FIGS. 1 and 2 may be more clearly understood let us first assume that the transparent conductive layers 22 and 24 are connected to ground.

Application of an alternating voltage from the source 37 to the top electrode 31 would then cause a periodic transverse contraction and expansion in the thickness dimension of the piezoelectric material at that point of the bar 12. This transverse vibration will travel in both directions around the closed acoustical path provided by the rod 12 and the return path member 25, and will result in standing waves of relatively high amplitude, since the frequency of the alternating voltage applied from the source 37 will be of a constant resonant frequency which is such that the time for the transverse standing wave to travel around the closed acoustical path is equal to the time for the period of application of each wave of alternating voltage applied by the source 37. While other resonant standing waves may be obtained at higher frequencies, the vibration waves thus produced in the piezoelectric material of the rod 12 will induce coresponding voltage waves between the top surface 14 and the bottom grounded electrode 27 of the piezoelectric material of the rod 12.

Furthermore, since the closed loop 12–25 is assumedly acoustically homogeneous, it can be seen that the exciting voltage applied at contact 31 by the source of constant resonant frequency alternating voltage 37 may be applied at any point along the piezoelectric material of the rod 12 so as to set up a standing wave which would be at a maximum at the point of application, but which would vary as a cosine function of $2\pi nx/L$ where L is the total path length; $n$ equals any integer; and $x$ equals circumferential distance from the electrode 31.

On the other hand, the second contact electrode 33 is critically positioned on the piezoelectric bar 12 in spaced relation to the electrode 31 at a location on the loop 12–25 where a null vibration and voltage exists due to the first excitation effected by the source 37 through the electrode 31. An alternating signal voltage is then applied by the electrode 33 of an equal amplitude to that applied through the electrode 31 and of the same constant resonant frequency, but shifted ninety degrees (90°) in phase from the alternating voltage applied by the source 37. Thus the alternating voltage applied by the source 43 at the second electrode 33 serves to set up a second standing wave which would be at a maximum at the point of application, but which would vary as a cosine function of $2\pi\ nx/L$, and $x$ equals the circumferential distance from this electrode 33.

It may be shown mathematically that the superposition of these two standing waves produced by the alternating voltages applied at the electrodes 31 and 33 will result in a condition providing a constant magnitude variable phase voltage across the thickness of the piezoelectric material of the rod 12 at all points. Now with the transparent conductive layers 22 and 24 of the electroluminescent phosphor coatings 16 and 18 being grounded, as heretofore assumed, a constant brightness display would be effected by the electroluminescent phosphor coatings 16 and 18 at all points thereon. However, upon only one excitation voltage being applied at the electrode 31, for example, instead of both excitation voltages being applied through the electrodes 31 and 33, there would be a stationary display pattern of brightness variation, actually being zero brightness in alternate bands due to the fact that the electroluminescent phosphor coating does not emit light when voltage below a certain threshold value is applied.

If now, instead of grounding the upper transparent conductive layers 22 and 24, these conductors are connected as shown in FIG. 1 to another oscillator or source of alternating voltage 21 of a frequency which may be varied by adjustment of the operator-operative control 51 to selectively provide a slightly higher or lower frequency than that of the voltages supplied from the first sources 37 and 43, then this alternating voltage from the source 21 would be applied to the electroluminescent phosphor layers 16 and 18 in series with the voltages induced in the piezoelectric bar 12 by the standing waves produced by the excitation voltages provided by the alternating voltage sources 37 and 43.

While the frequency of this resultant summation voltage will be mathematically identical to the original frequency of the alternating voltages supplied by the excitation sources 37 and 43 the resultant summation alternating voltage will be shifted in phase so as to vary in phase at a rate proportional to the algebraic sum of the respective frequencies. Hence, from time to time, the voltage supplied from the voltage source 21 will add to or subtract from the alternating voltage induced in the piezoelectric bar 12 by the standing waves effected by the alternating voltage sources 37 and 43 to form a voltage gradient along the electroluminescent phosphor layers 16 and 18 so that maximums and minimums in the total voltage applied to the electroluminescent phosphor layers 16 and 18 will then move, causing a corresponding change in the gradient, along the display in a direction and at a rate determined by the frequency difference or sum thereof through the operation of an equivalent circuitry shown by FIG. 5.

The direction of the movement of the light display will depend upon whether the variable frequency of the alternating voltage supplied by source 21 is greater or less than the constant resonant frequency of the alternating voltages supplied by the sources 37 and 43.

Thus the constant amplitude variable frequency alternating voltage supplied by the source 21 acts through the capacitive effect of the electroluminescent phosphor layers 16 and 18 and the capacitive effect of the piezoelectric material of the rod 12 so as to add in some locations and subtract in other locations depending on the phase of the voltage induced at that location in the piezoelectric material by the traveling standing waves produced by the excitation voltages 37 and 43.

The traveling standing waves thus produced move around the closed acoustical path 12–25 so as to induce in the piezoelectric material of the bar 12 a constant amplitude output voltage which, however, varies continuously in phase at different locations in the piezoelectric bar 12 in timed relation to the standing waves as the standing waves move around the closed acoustical path. This in turn varies the illumination of electroluminescent phosphor material on the displayed surface area 14 of the piezoelectric bar 12 dependent upon the effective phase of the induced voltage at each location at any particular time.

The electroluminescent phosphor material of the layers 16 and 18 acts to emit light upon the effective summation voltage being above a certain threshold value at a given location and time. Thus the arrangement is such that the effective summation voltage at a given location varies above and below the threshold value during the cycle of operation as the standing wave moves around the acoustical path to provide the desired display of moving light and dark bands.

In order to obtain the desired number of such moving stripes of light and dark bands, the operating frequencies are chosen so as to equal the desired harmonic of the fundamental resonance. Also the stripes may be at an angle to the direction of movement or may have the form of any single-valued line across the width of the display, depending upon the shape of the two excitation contacts 31 and 33, as shown by FIGS. 1 and 2.

Thus, it will be seen that through the provision of the two excitations at the electrodes 31 and 33 in timed quadrature, shifted ninety degrees (90°) in phase, and applied simultaneously by the sources 37 and 43, respectively, to the two electrodes 31 and 33 which are positioned in spaced quadrature, i.e. at two excitation points a quarter of wave length apart on the piezoelectric bar 12, there is induced a constant amplitude alternating output voltage of varying phase in the piezoelectric material of the bar 12 effective at all points on the bar 12 and a rotating electrical field which varies continuously in phase at a given location on the piezoelectric bar 12.

Figure 5:
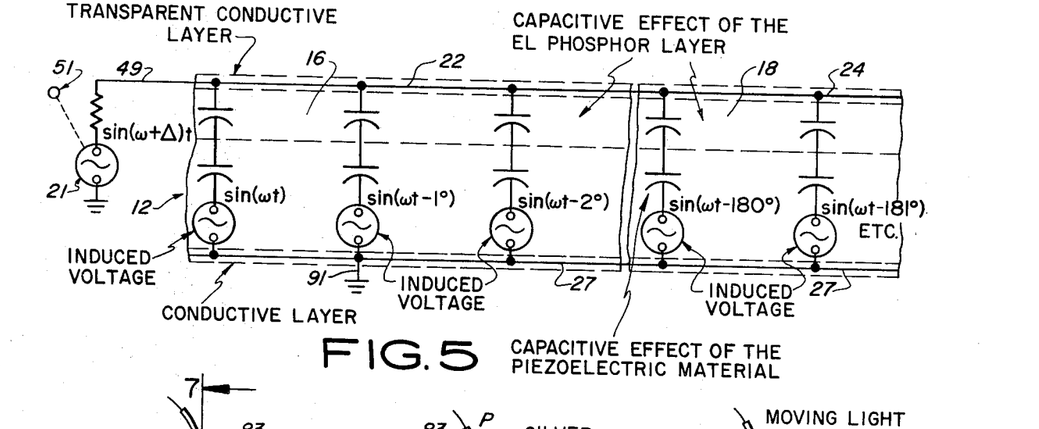
FIG. 5 is an illustration showing an equivalent electrical circuit for the device of FIG. 1 with the transparent electrode being excited by the third alternating voltage source serially applied across the transparent electrode and electroluminescent phosphor in an algebraic summing relation to the alternating voltage induced in the piezoelectric material by traveling waves of vibration.

Such variable phase constant amplitude voltage and rotating field in the piezoelectric material of the bar 12 has added thereto, as shown by the equivalent circuit of FIG. 5, an alternating voltage applied by the source 21 which is in turn connected across the electroluminescent phosphor layers 16–18 so as to add at some locations and subtract at other locations to the induced voltage depending upon the phase of the induced voltage at that location. This in turn causes the resultant effective alternating voltage at such location to exceed or fall below the light emitting threshold voltage of the electroluminescent phosphor layer depending upon the phase of the induced voltage at that location at a given time so that at the display surface 14 moving dark and light bands are effected by the electroluminescent phosphor layers 16 and 18, as shown pictorially by the dotted areas of FIG. 2.

Moreover, through the provision of the closed acoustical loop 12–25 standing waves may be provided which are not effected by longitudinal boundary conditions.

Further by the superposition of the two standing waves produced by the excitation voltages from the sources 37 and 43 there may be provided a constant amplitude variable phase voltage output and a rotating field in the closed acoustical loop. The application then of an alternating voltage of a different frequency from the source 21 in conjunction with the variable phase voltage output serves to generate moving positions of maximum and minimum voltage applied to the electroluminescentphosphor. This in turn causes a resultant summation voltage applied at certain portions of the phosphor layers to exceed a threshold value for effecting illumination of that portion of the phosphor layer at such position while the resultant summation voltage applied at other portions of the phosphor layers fall below the threshold value so as to terminate illumination of that portion of the phosphor layer at such position to provide a moving display of light and dark bands in a direction depending upon whether the frequency of the alternating voltage from the source 21 is lower or higher than the resonant frequency of the alternating voltage supplied by sources 37 and 43. Similarly, there may be effected a display in which the light and dark bands may be relatively stationary depending upon the operating conditions effecting the rotating field and the directional sense and speed of rotation thereof.

Figures 6, 7, 8:
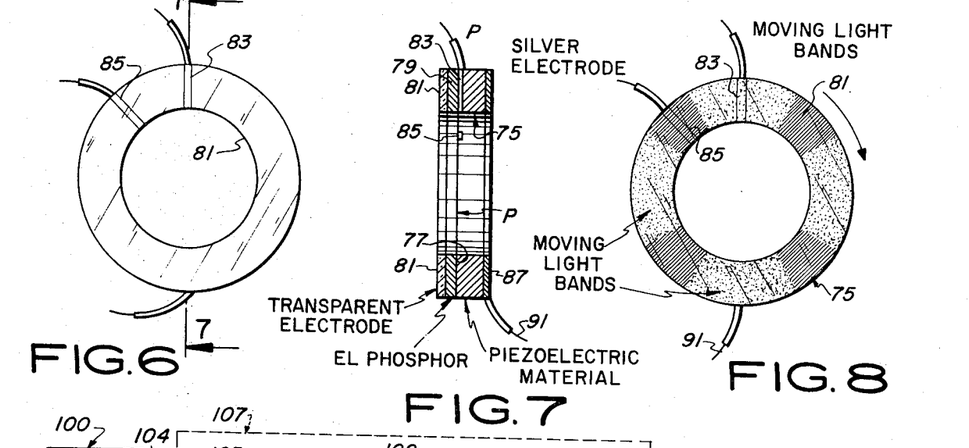
FIG. 6 is a side view of a second form of toroidal display device embodying the invention.
FIG. 7 is a sectional view of FIG. 6 taken along the line 7—7 of FIG. 6 and looking in the direction of the arrows with the toroidal ring of a piezoelectric material being polarized parallel to the thickness thereof as indicated by the arrows P and perpendicular to the display surface of the toroidal ring.
FIG. 8 is a side plan view of FIG. 6 illustrating the display surface of the toroidal ring with bands of lighted portions at a particular instant of time indicated by the dotted portions on the drawing.

MODIFIED FORM OF THE INVENTION OF FIGS. 6, 7 AND 8

In a modified form of the invention shown by FIGS. 6, 7 and 8, the return acoustical path 25 of the form of the invention of FIGS. 1 and 2 has been eliminated by providing a toridal ring indicated generally by the numeral 75 formed of a suitable piezoelectric material such as a lead-zirconate-titanate composition which may be purchased under the trade name Clevite PZT-4 from the Clevite Corporation of Cleveland, Ohio. In thus utilizing in the display device an integral piezoelectric ring 75 in place of the bar of piezoelectric material 12 and the separate return path 25 of zinc or other suitable material, there may be avoided the problems of bonding one to the other in the form of the invention shown by FIGS. 6, 7 and 8.

In the particular form of the modified form of the invention, the toroidal ring 75 has been formed with an outer diameter of 2.0 inches, an inner diameter of 1.25 inches, and a thickness of .25 inch. Further the piezoelectric material is polarized parallel to the thickness of the ring 75 as indicated by the arrow P of FIG. 7 and perpendicular to a display surface 77 provided at one side of the ring 75, as shown in FIG. 7.

Figure 9:
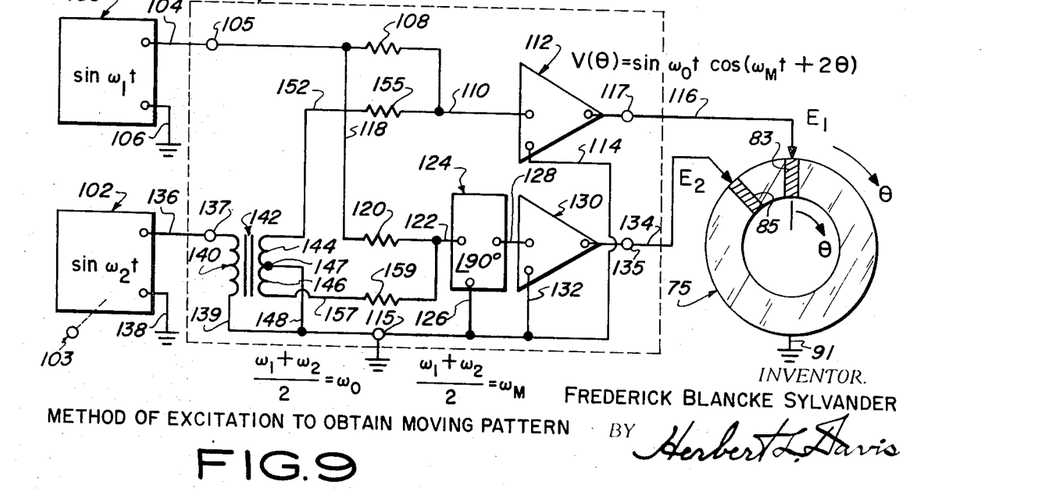
FIG. 9 is a wiring diagram of an improved method and circuitry for excitation of the display device of FIG. 6 so as to obtain a moving light pattern by mixing an alternating voltage source of a different frequency with each of two original resonant frequency excitations for the piezoelectric material in such a manner that no excitation need be applied to the transparent material as in the excitation circuitry of FIG. 1. However, as illustrated by the circuitry of FIG. 5 the transparent conductive layer on the display surface of the device of FIG. 6 serves in the circuitry of FIG. 9 to connect the source of alternating voltage of different frequency in series with different phase voltage outputs occurring in alternate lighted node patterns.
Figure 10:
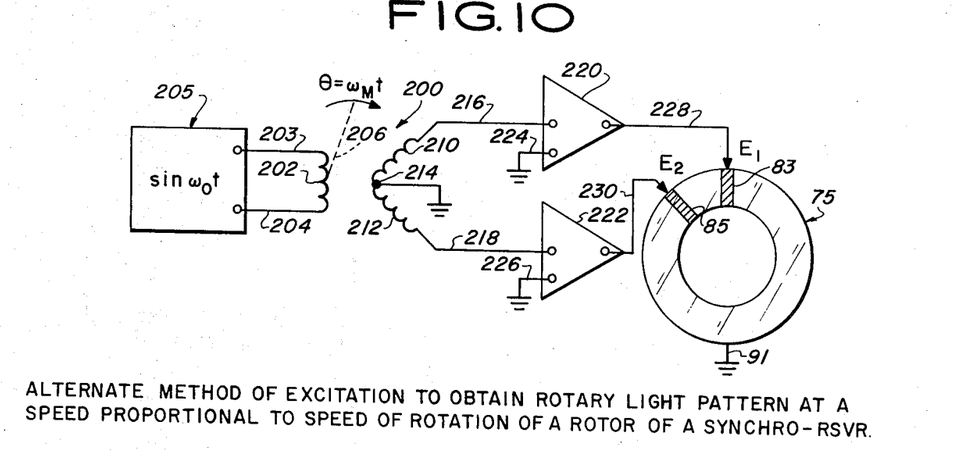
FIG. 10 is a wiring diagram of another improved method and circuitry for exciting the piezoelectric display device of FIG. 6 directly from a single synchro resolver so as to cause a rotating light pattern on the display surface of the device at a speed proportional to the speed of rotation of a rotor of the resolver.
Figure 11:
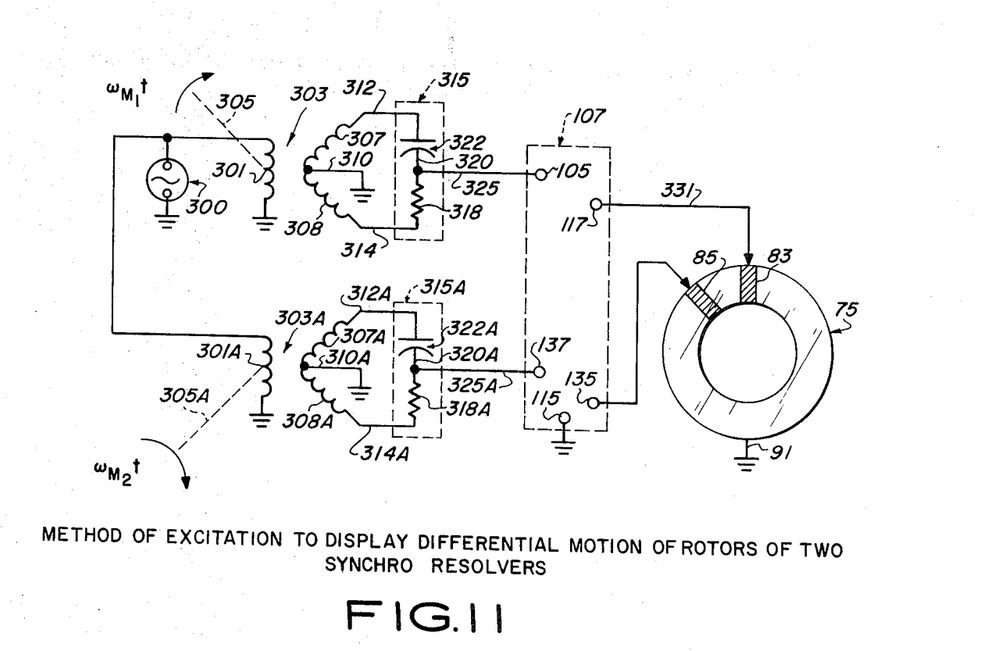
FIG. 11 is a wiring diagram of another method and circuitry for exciting the piezoelectric display device of FIG. 6 so as to provide a rotating light display pattern indicative of a different motion of two resolvers connected with a phase shifter network so that each resolver and network provides an output frequency which differs from the resolver excitation frequency by an amount proportional to the speed of rotation of the resolver.

A suitable electroluminescent phosphor material such as zinc-sulfo-selenide phosphor is applied to the display side surface 77 of the toroid in a phosphor layer 79 about 1-2 mils thick, and covered by a transparent conductive layer 81, as shown in FIG. 7. Two electrode elements 83 and 85 are angularly positioned forty-five degrees (45°) apart about the toroidal ring 75, as shown by FIG. 6. Both of the electrodes 83 and 85 are connected directly to the surface 77 of the piezoelectric ring 75 in electrical contacting relation therewith, as illustrated in FIG. 7. A third electrode 87 is mounted directly on the opposite side surface 89 of the piezoelectric material of the toroidal ring 75, as best shown in FIG. 7. Electrode 87 may be connected through a suitable conductor 91 to ground while the opposite electrodes 83 and 85 may be connected to suitable sources of alternating voltage, as shown in FIGS. 9, 10 and 11, as hereinafter explained in greater detail.

Furthermore, it has been found that upon applying across the electrode 83 and the grounded electrode 87 of the display device of FIG. 6 an alternating voltage of about three hundred (300) volts RMS at a resonant frequency of about fifty-two (52) kilocycles per second, sufficient output voltage was obtained from the piezoelectric material of the toroidal ring 75 to cause a visible glow of the phosphor layer 79 in a four node pattern, as shown by FIG. 8.

The term resonant frequency, as used herein, refers to an alternating excitation voltage of a frequency such that the time for the transverse standing vibration wave produced by the excitation voltage in the piezoelectric material of the toroidal ring 75 to travel an integral number of times around the closed path of the toroidal ring 75 is equal to the time for the period of application of each wave of the alternating voltage by the source of alternating voltage.

Moreover, a two node pattern of illumination may be obtained upon the excitation voltage being reduced to a frequency of about thirty-five (35) kilocycles per second (not exactly half of the resonant frequency of fifty-two (52) kilocycles per second, because the speed of the travel of the vibration wave produced by the alternating excitation voltage in the piezoelectric material varies as a function of the excitation frequency).

A higher number of nodes of illumination may be obtained by using alternating excitation voltages of a higher frequency equal to a multiple of the resonant frequency of fifty-two (52) kilocycles per second. In the case of a larger diameter of the toroidal ring 75 the required resonant frequencies would, of course, be decreased dependent upon the time required for the vibration wave produced by the alternating excitation voltages to travel about the toroidal ring 75.

Furthermore application of the above mentioned alternating excitation voltage at the resonant frequency of fifty-two (52) kilocycles per second to the second electrode 85 instead of the first electrode 83 would produce the four node illumination pattern of FIG. 8 rotated by an angle of forty-five degrees (45°) corresponding to the angle between the electrodes 83 and 85. Application of the same excitation to both electrodes 83 and 85 simultaneously would produce a four node pattern illumination at an angle halfway between electrodes 83 and 85.

Varying the ratio of the two excitation amplitudes will cause the pattern to move to any desired position between the two extremes. Application of equal amplitude signals ninety degrees (90°) apart in phase will result in an essentially constant light output from the entire electroluminescent side surface 77 of the toroidal ring 75.

In the aforenoted case, although not visibly evidenced, the voltage output from the piezoelectric material at any angle is of a phase proportional to the angle. Moreover, as heretofore explained with reference to the invention of FIGS. 1 and 2, upon a voltage of slightly different frequency from the excitation frequency being applied through the transparent conductive layer 81, of FIG. 7, there will be effected a rotation of the illumination pattern at a controllable speed and direction. However, a very low source impedance of the secondary voltage is necessary in order to avoid a background illumination from being superimposed upon the rotating pattern. Thus the output voltages at various points along the display surface of the toroidal ring 75 are at all possible phase angles. This allows a circulating current to be applied through the transparent conductive layer 81 without need for grounding such layer. In order to obtain the desired effect only, this voltage must come from a source impedance much lower than the integrated parallel impedances of the circulating paths 81.

MODIFIED METHOD AND MEANS OF FIG. 9

A modified method and means for obtaining the desired moving light pattern is illustrated in FIG. 9, in which there is provided a source 100 of alternating resonant frequency voltage which varies as a sine function of $\omega_1 t$ in which $\omega_1$ refers to $2\pi f_1$ and another source of alternating voltage 102 of a frequency which varies as a sine function of $\omega_2 t$ in which $\omega_2$ refers to $2\pi f_2$. The frequency of the alternating voltage from source 102 may be varied by adjustment of a suitable operator-operative control 103 to a frequency slightly higher or lower than the resonant frequency of the first source 100. The output from the source 100 is applied through an output conductor 104 and an opposite output conductor 106 connected to ground.

The conductor 104 leads to an input terminal 105 of a frequency mixing network 107 having a grounded input-output terminal 115. The input terminal 105 is connected to a resistor element 108 and through a conductor 110 to an input terminal of an amplifier 112 having an input-output conductor 114 leading to a grounded terminal 115 of the network 107 and an opposite output conductor 116 leading to an output terminal 117 of the network 107. Th conductor 116 leads from the network 107 and an output of the amplifier 112 to the excitation electrode 83 of the toroidal ring display device 75. There also leads from the conductor 104 a conductor 118 which leads through a resistor element 120 and a conductor 122 to an input terminal of a suitable ninety degree (90°) phase shifter network 124. The ninety degree (90°) phase shifter network 124 has an input-output conductor 126 leading to the grounded terminal 115 and an opposite output conductor 128 leading to an input terminal of an amplifier 130. The amplifier 130 in turn has a grounded input-output conductor 132 leading to the grounded terminal 115 and an opposite output conductor 134 leading to an output terminal 135 of the network 107. The conductor 134 leads from the network 107 to a second excitation electrode 85 on the toroidal ring display device 75, as heretofore explained.

Upon appropriate adjustment of the operator-operative control 103, the source 102 selectively provides an alternating voltage of a slightly higher or lower frequency than the frequency of the resonant alternating voltage supplied by the source 100. The source 102 has output terminals one of which is connected by a conductor 136 to an input terminal 137 of the network 107 and to one end of a primary winding 140 of a differential coupling transformer 142. The other output terminal of source 102 is connected by a grounded conductor 138 and a conductor 139 leading from the grounded terminal 115 of the network 107 to the opposite end of the primary winding 140. The transformer 142 has secondary windings 144 and 146 inductively coupled to the primary winding 140 in an arrangement such that there is induced in the secondary winding 146 an alternating voltage which is one hundred and eighty degrees (180°) out of phase with the alternating voltage induced in the secondary winding 144.

The secondary windings 144 and 146 each have ends connected together at a center tap 147 and through a conductor 148 to the terminal 115. An opposite end of the winding 144 is connected through a conductor 152 and a resistor 155 to the conductor 110 leading to the input of the amplifier 112. The alternating voltage induced in the winding 144 is applied through the resistor 155 in additive relation to the alternating voltage applied by the source 100 through the resistor 108 so as to effect through the amplifier 112 an alternating voltage $E_1$ at electrode 83 which is equal to $$\sin \omega_1 t + \sin \omega_2 t = 2 \sin \omega_0 t \cos \omega_M t$$

On the other hand the alternating voltage induced in the secondary winding 146 is one hundred and eighty degrees (180°) out of phase with the alternating voltage induced in the secondary winding 144. Thus the alternating voltage from the secondary winding 146 is applied through a conductor 157 and a resistor 159 to the conductor 122 in opposing relation to the alternating voltage applied through the resistor 120 by the source 100 so as to subtract the one from the other to effect an alternating voltage equal to $\sin \omega_1 t - \sin \omega_2 t = 2 \cos \omega_0 t \sin \omega_M t$.

In order to correct for the ninety degree (90°) carrier phase shift between the summation and subtraction signals, the alternating voltage difference signal at the conductor 122 is applied through a ninety degree (90°) phase shifter 124. An output conductor 128 leads therefrom to an input of an amplifier 130 so as to apply through the amplifier output conductor 134 to the electrode 85 an alternating voltage $$E_2 = (\sin \omega_1 t - \sin \omega_2 t) \ (90° \text{ carrier phase shift})$$
$$= (2 \cos \omega_0 t \sin \omega_M t) \ (90° \text{ carrier phase shift})$$
$$= 2 \sin \omega_0 t \sin \omega_M t$$

Through the foregoing arrangement, the alternating excitation voltage of different frequency provided by the source 102 is mixed with each of the original alternating voltage excitations provided by the resonant frequency source 100 to cause in-phase carriers and quadrature modulation envelopes applied at the two excitation electrodes 83 and 85 arranged in spaced relation.

This method requires no connection of the source of alternating voltage 102 through the transparent conductive electrode 81, as in the case of the form of the invention heretofore explained with refernce to FIGS. 1 and 2. Instead in the form of the invention of FIG. 9, three wires only are required to connect the sources 100 and 102 of alternating excitation voltages to the entire piezoelectric electroluminescent assembly to effect exactly the same phenomena of the moving light display, as explained by reference to the following equations applied to FIG. 9.

$$V(\theta) = E_1 \cos (2\theta) + E_2 \cos (2\theta + 90°)$$
$$= E_1 \cos (2\theta) - E_2 \sin (2\theta)$$
$$E_1 = \sin \omega_1 t + \sin \omega_2 t = 2 \sin \omega_0 t \cos \omega_M t$$
$$E_2 = [\sin \omega_1 t - \sin \omega_2 t][90° \text{ carrier phase shift}]$$
$$E_2 = [2 \cos \omega_0 t \sin \omega_M t][90° \text{ carrier phase shift}]$$
$$= 2 \sin \omega_0 t \sin \omega_M t$$
$$\therefore V(\theta) \approx \sin \omega_0 t \cos \omega_M t \cos (2\theta) - \sin \omega_0 t \sin \omega_M t \sin (2\theta)$$
$$= \sin \omega_0 t [\cos \omega_M t \cos (2\theta) - \sin \omega_M t \sin (2\theta)]$$
$$= \sin \omega_0 t \cdot \cos (\omega_M t + 2\theta)$$

In further explanation, it will be seen that the two frequency sources of alternating voltages 100 and 102 are of different frequency, one alternating voltage being at resonant frequency and the other alternating voltage being at a frequency either slightly greater or less than the resonant frequency dependent upon the adjustment of the operator-operative frequency control 103.

In such arrangement, the first and second alternating voltages are applied to an algebraic summation network, including resistors 108 and 155 and added therein to produce a carrier of the average frequency modulated by one-half the difference of the two frequencies to provide a first modulated envelope which is then applied through the amplifier 112 to excite the first electrode 83 of the toroidal ring 75.

Furthermore, by subtracting the alternating voltages of different frequency applied by the sources 100 and 102 in the algebraic summing network including resistors 120 and 159 and applying this difference through a ninety degree (90°) phase shifter 124, there is produced a carrier of the average frequency modulated by one-half the difference of the two frequencies to provide a second modulated envelope which is in turn applied through the output conductor 128 leading from the phase shifter network 124 to an input of the amplifier 138 and thereby through the output conductor 134 for exciting the second electrode 85.

This method of exciting the toroidal ring display device 75 of FIG. 9 produces the same moving light pattern at the display surface 77 thereof as may be obtained by the method heretofore explained with reference to FIG. 1, but has the advantage that in the method of FIG. 9 there is no need to separately connect the transparent electrode 81 for excitation from the source 102 of different frequency.

Transparent electrode 81 in the form of the invention illustrated in FIG. 9 does serve as a connecting path for the different phase voltages induced in alternate node patterns, hence need not be connected to ground. Moreover, this illumination pattern may be caused to rotate at controllable speed and direction by properly exciting the two electrodes 83 and 85. This may be done by exciting the two electrodes forty-five degrees apart in a spaced relation, as shown in FIG. 9, and at the resonant frequency for a four node pattern and by causing one of these carrier envelopes $E_1$ applied to the electrode 83 to be modulated by the cosine of $\omega_M t$ while the other envelope $E_2$ applied to the electrode 85 is modulated by the sine of $\omega_M t$, as set forth in the equations heretofore explained with reference to FIG. 9, in which $\omega_M$ equals half the difference of $\omega_1$ and $\omega_2$.

MODIFIED METHOD OF OBTAINING THE DESIRED MOVING LIGHT PATTERN OF FIG. 10

The foregoing may also be accomplished, as shown in FIG. 10, by including a resolver synchro 200 having a rotor winding 202 connected through conductors 203 and 204 to opposite terminals of a source of alternating voltage 205 of a frequency corresponding to the resonant frequency and an alternating voltage varying as a function of the sine of $\omega_0 t$. The rotor winding 202 is angularly positioned by a shaft 206 to vary as a function of $\omega_M t$ the inductive coupling relation between the rotor winding 202 and the stator windings 210 and 212 of the resolver synchro 200. The function of $\omega_M t$ corresponds to the speed of rotation of the rotor winding 202 relative to the stator windings 210 and 212.

The stator windings 210 and 212 have terminals connected to a ground center tap 214 and opposite terminals connected through conductors 216 and 218 to input terminals of amplifiers 220 and 222 having input-output grounded terminals 224 and 226, respectively. Further, output terminals of the amplifiers 220 and 222 are connected through conductors 228 and 230, respectively, to the excitation electrodes 83 and 85, respectively, of the toroidal ring 75 as heretofore explained.

In the foregoing arrangement of the resolver synchro 200, the alternating voltage applied to the rotor winding 202 will vary as a function of the sine of $\omega_0 t$ so that upon the rotor winding 202 being angularly positioned in relation to the stator windings 210 and 212 as a funtion of $\omega_M t$ there will be induced into the stator winding 210 the alternating voltage varying as a function of the sine of $\omega_0 t$ and modulated in the winding 210 as a function of the cosine of $\omega_M t$, while there will also be induced in the other stator winding 212 of the synchro resolver 200 the alternating voltage varying as a function of the sine of $\omega_0 t$ and modulated in the winding 212 in an opposite sense as a function of the sine of $\omega_M t$. There will then be effected across the output lines 224–228 of the amplifier 112 an alternating voltage $E_1$ varying as a function of $2 \sin \omega_0 t \cos \omega_M t$ while across the output lines 226–230 of the amplifier 222 there will be effected an alternating voltage $E_2$ varying as a function $2 \sin \omega_0 t \sin \omega_M t$.

Such arrangement then will produce the necessary excitation voltages $E_1$ and $E_2$ applied to the electrodes 83 and 85, respectively, required to effect the moving light display to show differential positional movement as well as accurate velocity of movement of the rotor winding 202 of the synchro 200 in relation to the stator windings 210 and 212 thereof. The latter excitation voltages produced by the aforenoted arrangement of the resolver synchro 200 correspond to the voltages $E_1$ and $E_2$ of the equations heretofore explained with reference to FIG. 9.

Thus by exciting the two electrodes 83 and 85 positioned on the path of the piezoelectric ring 75 in a spaced relation of a quarter of a wave length relative to the standing wave pattern propagated by an appropriate resonant frequency alternating voltage applied to one electrode 85 modulated by the sine of $\omega_M t$ (the speed of rotation of the rotor winding 202 of the synchro resolver 200) and by another resonant frequency alternating voltage applied to the other electrode 83 modulated by the cosine of $\omega_M t$, the piezoelectric material of the toroidal ring 75 will cause the electroluminescent layer 79 on the surface 77 of the ring 75 to effect a moving light band display indicative of the differential positional movement of the rotor winding 202 relative to the stator windings 210 and 212 as well as a light band display which follows the directional sense and velocity of the movement of the rotor winding 202 of the synchro resolver 200.

MODIFIED METHOD OF OBTAINING THE DESIRED MOVING LIGHT PATTERN OF FIG. 11

Furthermore, from the foregoing analysis it will be seen that a highly compatible source of signals for effecting a moving light pattern on a solid state electroluminescent display device may be any type of rotating phase shifter (such as a synchro resolver properly connected to one or two resistor-capacitor networks such as shown by FIG. 11). Such a device has as its output a constant alternating voltage having a frequency which differs from the carrier by an amount proportional to the speed of rotation of the synchro resolver.

Thus as shown with reference to FIG. 11, there is provided a source of alternating voltage 300 of a frequency corresponding to the resonant frequency and varying as a function of $\omega_0 t$. The source 300 has its output conductor connected across a rotor winding 301 of a resolver synchro 303 and across a rotor winding 301A of a second resolver synchro 303A. Rotor windings 301 and 301A are angularly positioned, respectively, through shafts 305 and 305A to vary as a function of $\omega_M t$ the inductive relationship between the rotor winding 301 and stator windings 307 and 308 of the resolver synchro 303 and the inductive relationship between the rotor winding 301A and stator windings 307A and 308A.

Terminals of the stator windings 307 and 308 are connected through a conductor 310 to ground while opposite output terminals of the stator windings 307 and 308 of the resolver synchro 303 are connected through conductors 312 and 314 to opposite terminals of a phase shifter network 315 including a resistor 318 connected at one end to the conductor 314 and the opposite end of the resistor 318 connected through a conductor 320 with a plate of a capacitor 322 having an opposite plate connected to the other conductor 312. An output conductor 325 leads from the conductor 320 of the phase shifter 315 to the input terminal 105 of a frequency mixing network 107, heretofore described with reference to FIG. 9 and having an output conductor 331 leading from the output terminal 117 to the excitation electrode 83 of the solid state electroluminescent display device 75.

The stator windings 307A and 308A of the resolver synchro 303A are connected through a conductor 310 to ground while opposite terminals of the stator windings 307A and 308A are connected through output conductors 312A and 314A to input terminals of a like resistor-capacitor phase shifter network 315A having a resistor 318A and a capacitor 322A connected by a conductor 320A.

An output conductor 325A leads from the conductor 320A to the input terminal 137 of the frequency mixing network 107, while an output conductor 331A leads from the output terminal 135 of the network 107 to an excitation electrode 85 of the electroluminescent display device 75.

It will be seen from the aforenoted arrangement that each rotating phase shifter or synchro resolver 303 and 303A and R-C network 315 and 315A has as its output a constant alternating voltage of a frequency which will differ from that provided by the source 300 by a value proportional to the speed of rotation of the rotor winding 301 and 301A and in a sense dependent upon the direction of rotation thereof. Each such phase shifter is shown connected through a resistor-capacitor network 315 and 315A, respectively, to produce sum and difference frequencies from its carrier which are applied through the frequency mixing network 107 so as to drive the display device 75 to accurately show the velocity of the device. Thus as shown by FIG. 11, two such phase shifters 301 and 301A and R-C networks 315 and 315A connected through the frequency mixing network 107 servo cause the device 75 to effect a moving light band pattern to display the difference and direction of difference between the velocities of rotation of the rotor windings 301 and 301A of the resolver synchros 303 and 303A.

There will be seen from the foregoing, that there has been provided means whereby excitation of an electroluminescent phosphor display element may be effected through standing waves of voltage propagated in a piezoelectric material by standing waves of transverse vibration in a closed acoustical path which need not necessarily be circular or wholly of piezoelectric material.

Furthermore, multi-nod light patterns may be effected by the means and methods of the present invention and there may be effected in a solid state electroluminescent display, light patterns which may be caused to move in a controllable direction and at a controllable speed. Furthermore, the invention may be applied to displaying the differential rotation of two positional transducers as well as provide a means of displaying the motion of a single resolvent transducer.

Although several embodiments of the invention have been illustrated and described, various changes in the form and relative arrangements of the parts which will now appear to those skilled in the art, may be made without departing from the scope of the invention. Reference is, therefore, to be had to the appended claims for a definition of the limits of the invention.

What is claimed is:

1. A solid state display device comprising: a display element providing a closed acoustical path, said display element including at least a part of a piezoelectric material having first and second surfaces, an electroluminescent layer havlng first and second surfaces, the second surface of said electroluminescent layer being affixed to the first surface of said part of the display element, a first driving electrode secured to the first surface of said part of the display element, a second driving electrode secured to the first surface of said part of the display element in a predetermined spaced relation to said first driving electrode, electrically conductive means affixed to the first surface of said electroluminescent layer, and a common electrode means secured to the second surface of said part of the display element.

2. The combination defined by claim 1 in which said first and second driving electrodes are secured to the first surface of said part of the display element in said predetermined spaced relation and between the second surface of the electroluminescent layer and the first surface of said part of the display element.

3. The combination defined by claim 1 in which the electroluminescent layer includes first and second portions affixed in spaced relation on the first surface of said part of the display element, the first and second driving electrodes being secured to the first surface of said part of the display element in said predetermined spaced relation with one of said driving electrodes being secured to the first surface of said part of the display element in a space provided between said first and second portions of said electroluminescent layer, and the other of said driving electrodes being secured to the first surface of said part of the display element at a position adjacent an end of the first of said portions of the electroluminescent layer.

4. A method of effecting a visual display of lighted stripes by a layer of electroluminescent material on a display surface of at least a part of a closed loop element, said part having a thickness and being of a piezoelectric material polarized in a sense perpendicular to the display surface and parallel to the thickness of said part, and said element including an acoustical return path having essentially identical acoustic properties to that of the part of said element of piezoelectric material; said method comprising the steps of applying sinusoidal voltages at different points along the display surface of said part and parallel to the thickness of said part so as to set up in the piezoelectric material standing waves of vibration extending transverse to the thickness of said part thereby generating secondary voltages in response to the standing waves of vibration which vary in amplitude dependent upon that position along the display surface at which the secondary voltages may be sensed by the electroluminescent layer so that portions of the electroluminescent layer at those positions at which the secondary voltages exceed in amplitude a threshold value for illumination of the electroluminescent layer emit light to provide the visual display, and in which the application step includes applying one of a pair of resonant frequency alternating voltages to a first point on the display surface, and applying the other voltage of the pair of resonant frequency voltages to a second point on the display surface selectively positioned on the display surface in spaced relation to the first point on the display surface so as to correspond to that position at which a null secondary voltage would be generated by the wave of vibration effected by the application of the one resonant frequency voltage applied to the first point on the display surface.

5. A method of effecting a visual display of lighted stripes by a layer of electroluminescent material on a display surface of at least a part of a closed loop element, said part having a thickness and being of a piezoelectric material polarized in a sense perpendicular to the display surface and parallel to the thickness of said part, and said element including an acoustical return path having essentially identical acoustic properties to that of the part of said element of piezoelectric material; said method comprising the steps of applying a pair of alternating voltage excitation signals to the display surface of said part at a resonant frequency, one of said excitation signals being ninety degrees out of time phase with the other of said pair of excitation signals, applying the pair of alternating voltage excitation signals at different points and in a predetermined spaced relation along the display surface of said part in a sense perpendicular to the display surface and parallel to the thickness of said part so as to set up in the piezoelectric material standing waves of vibration extending transverse to the thickness of said part, generating by these waves of vibration in the piezoelectric material secondary voltages which vary in amplitude at any given time dependent upon that position along the display surface at which the generated voltage may be sensed by the layer of electroluminescent material, applying another alternating voltage excitation signal of a different frequency and in an algebraic summing relation to the generated secondary voltages so as to effect resultant summation voltages which vary in amplitude at any given time above and below a threshold value for illumination of the electroluminescent layer dependent upon a position along the part at which the summation voltages may be sensed by the layer of electroluminescent material, and effecting lighted stripes by the electroluminescent layer at those positions on the part of piezoelectric material at which the summation voltages exceed in amplitude the threshold value.

6. A method of effecting a visual display of lighted stripes by a layer of electroluminescent material on a display surface of at least a part of a closed loop element, said part having a thickness and being of a piezoelectric material polarized in a sense perpendicular to the display surface and parallel to the thickness of said part, and said element including an acoustical return path having essentially identical acoustic properties to that of the part of said element of piezoelectric material; said method comprising the steps of supplying a pair of resonant frequency alternating voltage signals, applying another alternating voltage signal of a different frequency to said pair of resonant frequency signals so as to modulate one of said pair of resonant frequency signals in one sense and the other of said pair of resonant frequency signals in an opposite sense, displacing one of said pair of modulated signals ninety degrees out of time phase, applying the resultant pair of modulated and phase displaced resonant frequency alternating voltage signals at different points in a predetermined spaced relation along the display surface of said part in a sense perpendicular to the display surface and parallel to the thickness of said part so as to set up in the piezoelectric material standing waves of vibration extending transverse to the thickness of said part, generating by these waves of vibration in the piezoelectric material secondary voltages which vary in amplitude at any given time above and below a threshold value for illumination of the electroluminescent layer dependent upon that position along the display surface at which the generated voltages may be sensed by the electroluminescent layer, and effecting lighted stripes by the electroluminescent layer at those positions at which the secondary voltages exceed in amplitude the threshold value.

7. A method of effecting a visual display of lighted stripes by a layer of electroluminescent material on a display surface of at least a part of a closed loop element, said part having a thickness and being of a piezoelectric material polarized in a sense perpendicular to the display surface and parallel to the thickness of said part, and said element including an acoustical return path having essentially identical acoustic properties to that of the part of said element of piezoelectric material; said method comprising the steps of supplying resonant frequency alternating voltages, modulating said alternating voltages so as to provide a first alternating voltage signal modulated in one sense and a second alternating voltage signal modulated in a second sense, applying the resultant pair of modulated resonant frequency alternating voltage signals at different points in a predetermined spaced relation along the display surface of said part in a sense perpendicular to the display surface and parallel to the thickness of said part so as to set up in the piezoelectric material standing waves of vibration extending transverse to the thickness of said part, generating by these waves of vibration in the piezoelectric material secondary voltages which vary in amplitude at any given time above and below a threshold value for illumination of the electroluminescent layer dependent upon that position along the display surface at which the generated voltages may be sensed by the electroluminescent layer, and effecting lighted stripes by the electroluminescent layer at those positions at which the secondary voltages exceed in amplitude the threshold value.

8. A device for displaying a moving symbol comprising a layer of electroluminescent phosphor; means for applying across the phosphor layer alternating current voltages having a gradient along the phosphor layer to provide the symbol; and means for changing the gradient to sequentially change the voltages across the phosphor layer to provide movement of the symbol in a direction and at a speed in accordance with the sequence and rate of change of the alternating current voltages.

9. A method for displaying a moving symbol comprising applying alternating current voltages across a layer of electroluminescent phosphor to provide the symbol, causing the voltages to have a gradient along the phosphor layer, and changing the gradient to sequentially change the voltages across the phosphor layer to provide movement of the symbol in a direction and at a speed in accordance with the sequence and rate of change of the alternating current voltages.

10. The method defined by claim 4 including the step of modifying the secondary voltages so as to effect movement of the lighted stripes effected by the electroluminescent layer in a direction and at a speed dependent upon the sense and extent of modification of the secondary voltages.

11. The solid state display device defined by claim 1 in which said part of said display element includes a toroidal ring of a piezoelectric material, said toroidal ring having first and second side surfaces, and the first and second driving electrodes being secured to the first side surface in a predetermined angular spaced relation one to the other.

12. The solid state display device defined by claim 1 in which said part of the display element includes a bar of a piezoelectric material, and said display element includes a return path element affixed to opposite ends of said bar and having substantially identical acoustic properties to that of said bar of piezoelectric material.

13. The solid state display device defined by claim 1 including said part having a thickness and being of a piezoelectric material polarized in a sense perpendicular to the first surface and parallel to the thickness of sad part.

14. The combination defined by claim 13 including means for providing alternating voltages of a resonant frequency for excitation of said first and second driving electrodes in a sense perpendicular to said first surface of the part and parallel to the thickness of said part so as to set up in the piezoelectric material of said part standing waves of vibration extending transverse to the thickness of said part for generating secondary voltages which vary in amplitude dependent upon the position along the first surface at which the generated voltages may be sensed by the electroluminescent layer, said resonant frequency of the alternating voltages corresponding to a frequency at which the wave of vibration set up by the alternating voltage travels around the closed acoustical path provided by the display element in a time equal to one period of the applied alternating voltage.

15. The combination defined by claim 14 including the first driving electrode being secured to the first surface in a predetermined spaced relation to the second driving electrode and in a position corresponding to that position at which a null secondary voltage would be generated by the wave of vibration set up by the resonant alternating voltage effecting excitation of the second driving electrode.

16. The combination defined by claim 15 in which the means for providing the alternating voltages of resonant frequency includes means for effecting the excitation of one of said driving electrodes with an alternating voltage ninety degrees out of the time phase with the alternating voltage for effecting the excitation of the other of said driving electrodes.

17. The combination defined by claim 16 including means for providing a third alternating voltage of a frequency different from the resonant frequency of the alternating voltages effecting the excitation of said first and second driving electrodes, and means for applying the third alternating voltage to the common electrode means and through the electrically conductive means to the electroluminescent layer to modify the secondary voltages generated by the waves of vibration set up in the piezoelectric material to effect a moving display of lighted stripes by the electroluminescent layer in a direction and at a speed dependent upon the sense and extent of modification of the secondary voltages.

18. The combination defined by claim 16 in which the electrically conductive means includes a transparent electrcally conductive layer having first and second surfaces, the second surface of said transparent conductive layer being affixed to the first surface of said electroluminescent layer.

19. The combination defined by claim 18 including means for providing a third alternating voltage of a frequency different from the resonant frequency of the alternating voltages effecting the excitation of said first and second driving electrodes, and means connecting the third alternating voltage to the common electrode means and the first surface of said transparent conductive layer so as to modify the secondary voltages generated by the waves of vibration set up in the piezoelectric material to effect a moving display of lighted stripes by the electroluminescent layer in a direction and at a speed dependent upon the sense and extent of modification of the secondary voltages.

20. The combination defined by claim 15 in which the means for providing the alternating voltages of resonant frequency includes a synchro resolver having a rotor winding and a pair of stator windings inductively coupled thereto, a source of the resonant frequency alternating voltage connected across said rotor winding, the rotor winding being angularly positioned so as to modulate in opposite senses the alternating voltage of resonant frequency induced in said pair of stator windings, one of said pair of stator windings being connected so as to effect the excitation of one of said driving electrodes with the modulated alternating voltage induced in said one stator winding, and the other of said pair of stator windings being connected for effecting the excitation of the other of said driving electrodes with the oppositely modulated alternating voltage induced in said other stator winding, and the modulation of the alternating voltages modifying the amplitude of the secondary voltages generated by the waves of vibration set up in the piezoelectric material so as to effect a moving display of light stripes by the electroluminescent layer in a direction and at a speed corresponding to the direction and speed of rotation of the rotor winding in relation to said pair of stator windings of the synchro resolver.

21. The combination defined by claim 15 in which the means for providing the alternating voltages of resonant frequency includes a pair of phase shifter networks, each of said pair of phase shifter networks having a synchro resolver including a rotor winding and a pair of stator windings inductively coupled thereto, a source of the resonant frequency alternating voltage connected across the rotor winding of the synchro resolver of each phase shifter network, the rotor winding of each synchro resolver being angularly positioned so as to modulate in opposite senses the alternating voltage of resonant frequency induced in said pair of stator windings by the rotor winding of the synchro resolver, each phase shifter network including a resistor connected between one of the stator windings and an output means and a capacitor connected between the other of the pair of stator windings and the output means, the output means from one of said pair of phase shifter networks supplying an alternating output voltage of a frequency which will differ from that provided by the source of resonant frequency alternating voltage in a sense dependent upon direction of rotation of the rotor winding of the synchro resolver of said one phase shifter network and by a value proportional to the speed of rotation of said rotor winding, the output means from the other of said pair of phase shifter networks supplying an alternating voltage of a frequency which will differ from that provided by the source of resonant frequency alternating voltage in a sense dependent upon direction of rotation of the rotor winding of the synchro resolver of said other phase shifter network and by a value proportional to the speed of rotation of the last mentioned rotor winding, a frequency mixing means, the frequency mixing means including a summing network, the output means from each of said pair of phase shifter networks being operably connected to said summing network, said summing network including first means to modulate in one sense the alternating voltages supplied by said one phase shifter network by the alternating voltages supplied by said other phase shifter network, second means to modulate in an opposite sense the alternating voltages supplied by said one phase shifter network by the alternating voltages supplied by said other phase shifter network, means for supplying the alternating voltages modulated in said one sense to one of said driving electrodes, other means for supplying the alternating voltages modulated in said opposite sense to the other of said driving electrodes, and the alternating voltages supplied to said driving electrodes being thereby modulated upon a difference in the rotation of said rotor windings so as to vary the relative excitation of the driving electrodes and thereby modify the secondary voltages generated by the waves of vibration set up in the piezoelectric material to effect a moving display of light stripes by the electroluminescent layer in a sense and at a speed corresponding to the sense and difference between the rotation of the rotor windings of the resolver synchros of the pair of phase shifter networks.

22. A solid state display device, comprising a closed acoustical loop including a display element of a piezoelectric material, means for applying alternating voltages to the piezoelectric material of the display element so as to set up a standing wave pattern of vibrations in the piezoelectric material for generating secondary voltages in the material which vary in amplitude above and below a threshold value at points along the display element dependent upon the wave pattern, and electroluminescent means on the display element to be illuminated at points on the element at which the generated secondary voltages exceed said threshold value.

23. The combination defined by claim 22 including means for modifying the effective amplitude of the generated secondary voltages to cause the electroluminescent means to produce a display pattern of illuminated bands movable in a direction and at a speed dependent upon the modifying means.

24. The combination defined by claim 23 in which the modifying means includes means for applying different alternating voltages to the generated secondary voltages to modify the effective amplitude thereof so as to cause the electroluminescent means to produce the display pattern of illuminated bands movable in a direction and at a speed dependent upon the sense and difference of the different alternating voltages applied by the modifying means.

25. The combination defined by claim 23 in which the modifying means includes means operable to modulate the alternating voltages applied to the piezoelectric material so as to modify the standing wave pattern of vibrations set up in the piezoelectric material to vary the secondary voltages generated thereby so as to cause the electroluminescent means to produce a display pattern of illuminated bands movable in a direction and at a speed dependent upon the operation of the modulating means.

26. The combination defined by claim 25 in which the modulating means includes a synchro resolver operably connected to modulate the alternating voltages applied to the piezoelectric material.

27. The combination defined by claim 25 in which the modulating means includes an algebraic summing network, a first source of alternating voltage, a second source of alternating voltage of a different frequency than the alternating voltage of the first source, the first and second sources of alternating voltages being operably connected to the summing network, the summing network including first means to modulate in one sense the alternating voltages from the first source by the alternating voltages from the second source, second means to modulate in an opposite sense the alternating voltages from the first source by the alternating voltages from the second source, and means for supplying the modulated alternating voltages to the means for applying alternating voltages to the piezoelectric material of the display element so as to continuously vary the standing wave pattern of vibrations set up in the piezoelectric material of the display element in such a manner as to modify the effective amplitude of the generated secondary voltages so as to cause the electroluminescent means to produce a display pattern of illuminated bands movable in a direction and at a speed dependent upon the modulation of the applied alternating voltages.

28. The combination defined by claim 23 in which the modifying means includes a pair of separately operable phase shifter networks electrically connected to a source of alternating voltage, output means from each of said phase shifter networks, a frequency mixing means operably connecting the output means from each of said phase shifter networks to the means for applying alternating voltages to the piezoelectric material of the display element so as to vary the standing wave pattern of vibrations set up in the piezoelectric material of the display element in such a manner as to modify the effective amplitude of the generated secondary voltages so as to cause the electroluminescent means to produce a display pattern of illuminated bands movable in a direction and at a speed indicative of the difference and sense of difference in operation of the separately operable phase shifter networks.

References Cited
UNITED STATES PATENTS

| | | | |
|---|---|---|---|
| 2,922,923 | 1/1960 | Yando | 315—55 |
| 3,157,823 | 11/1964 | Clapp | 315—169 |
| 3,243,648 | 3/1966 | Yando | 315—55 |

JAMES W. LAWRENCE, Primary Examiner

E. R. LA ROCHE, Assistant Examiner

U.S. Cl. X.R.

310—8.1; 315—169